April 14, 1953            R. F. WORLIDGE           2,634,926
APPARATUS FOR INSTALLATION IN AIRCRAFT
FOR RECEIVING FUEL AND OTHER LIQUIDS
IN FLIGHT AND CONTROL MEANS THEREFOR
Filed Jan. 17, 1950                         15 Sheets-Sheet 8

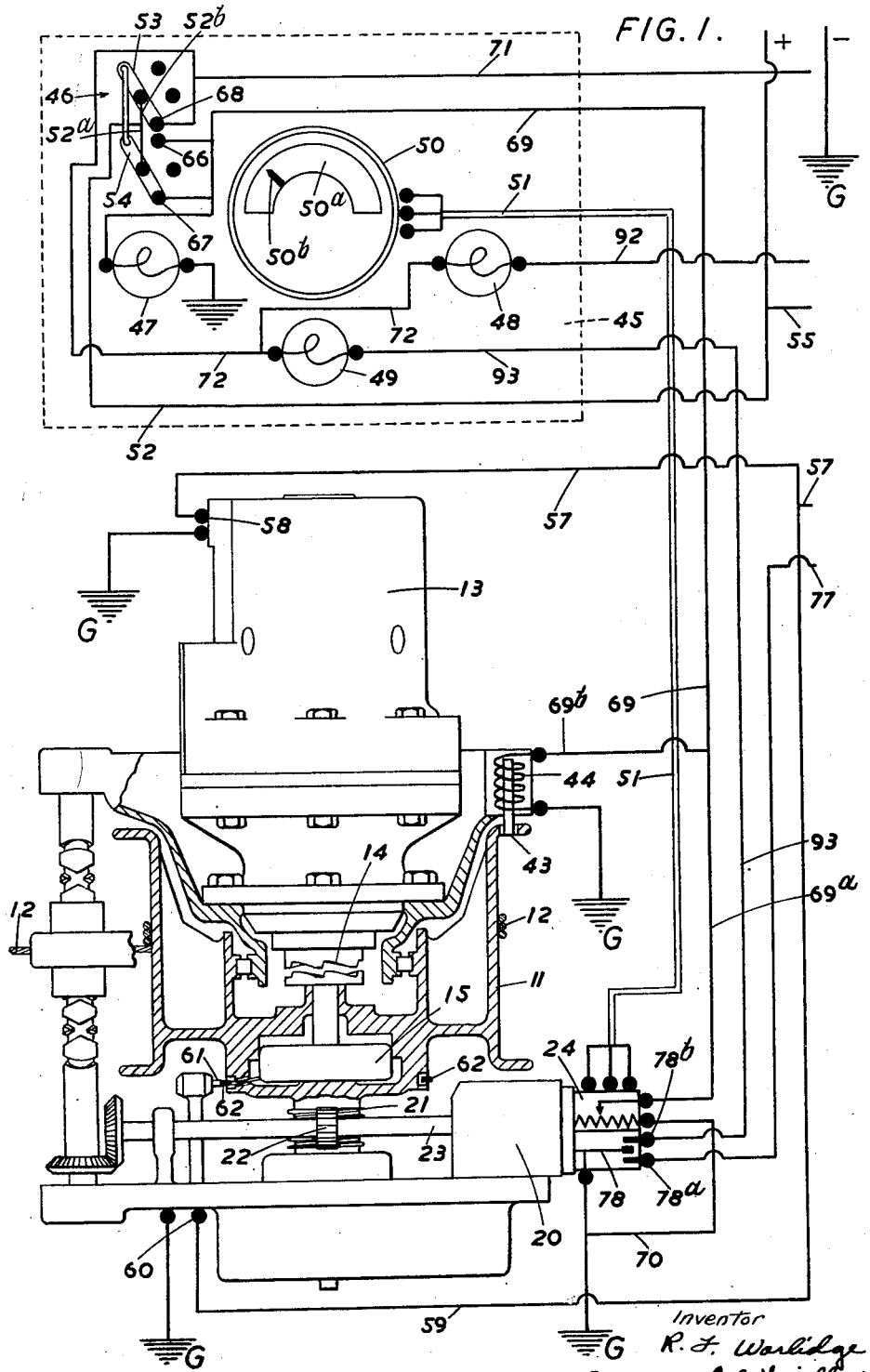

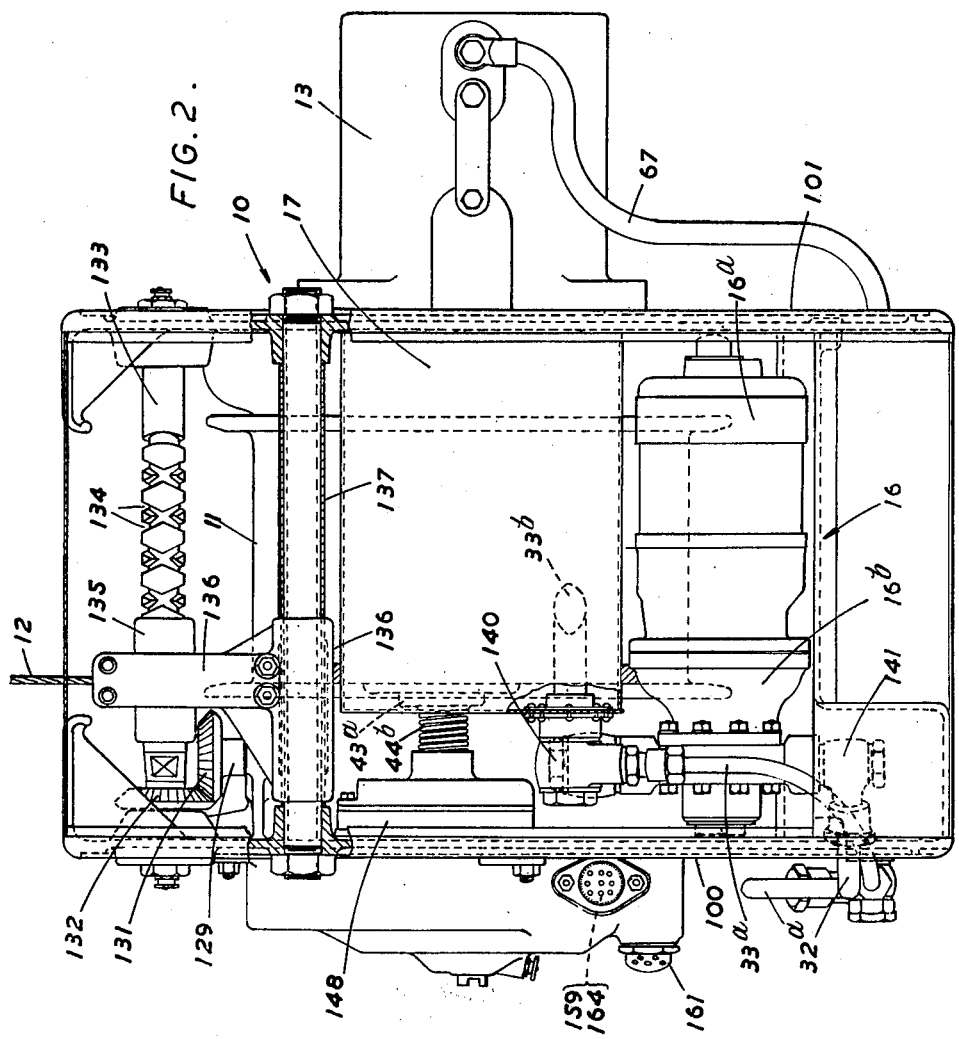

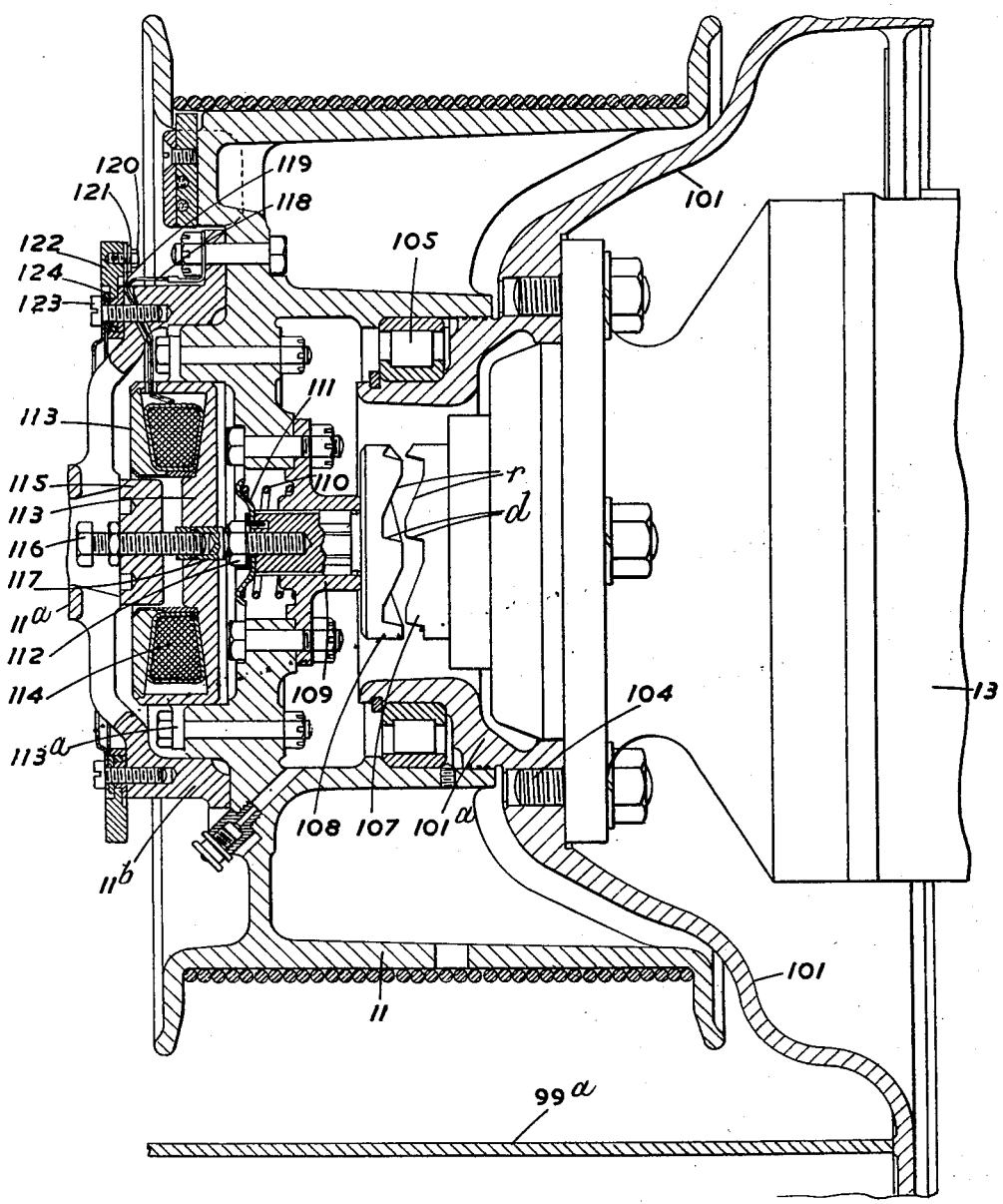

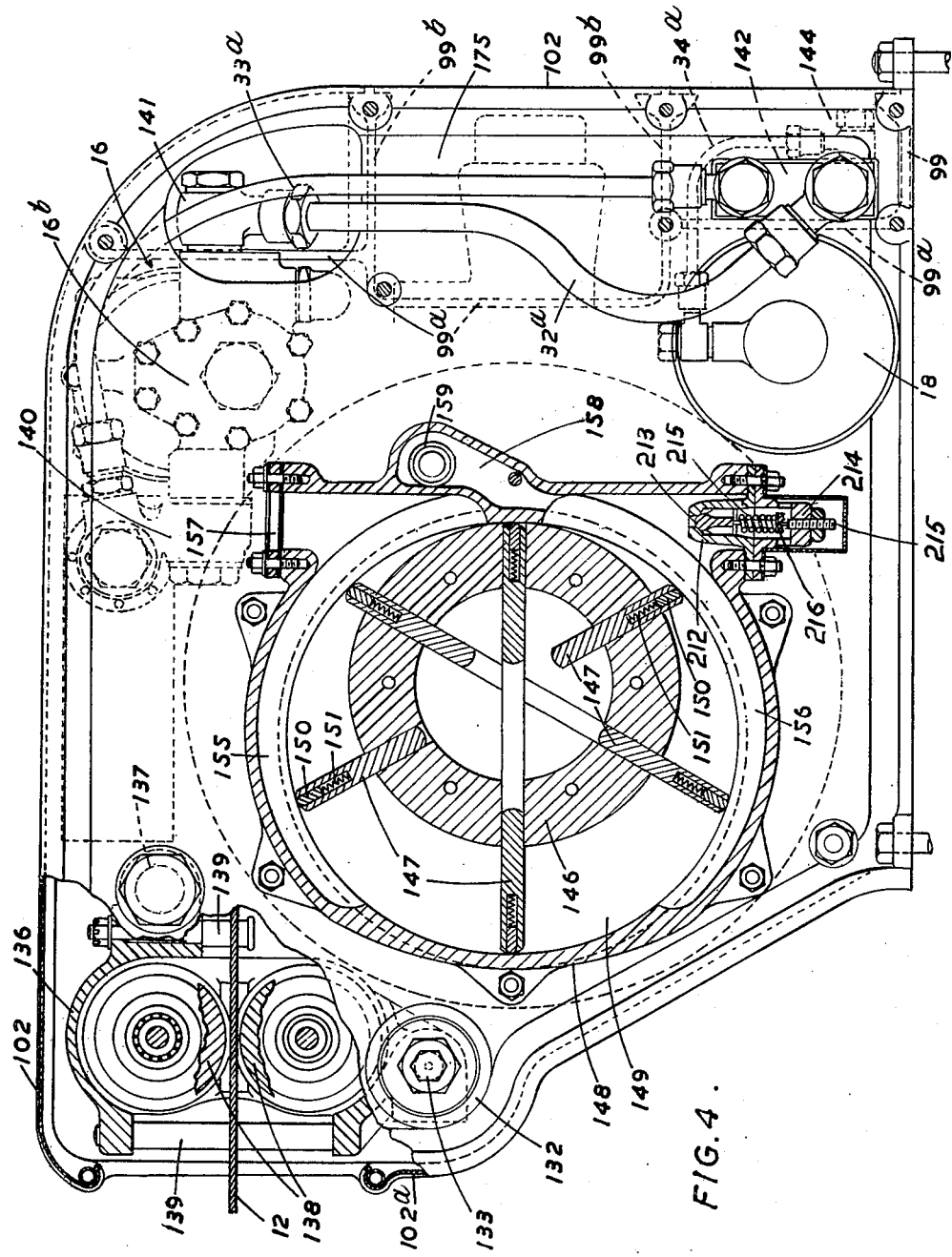

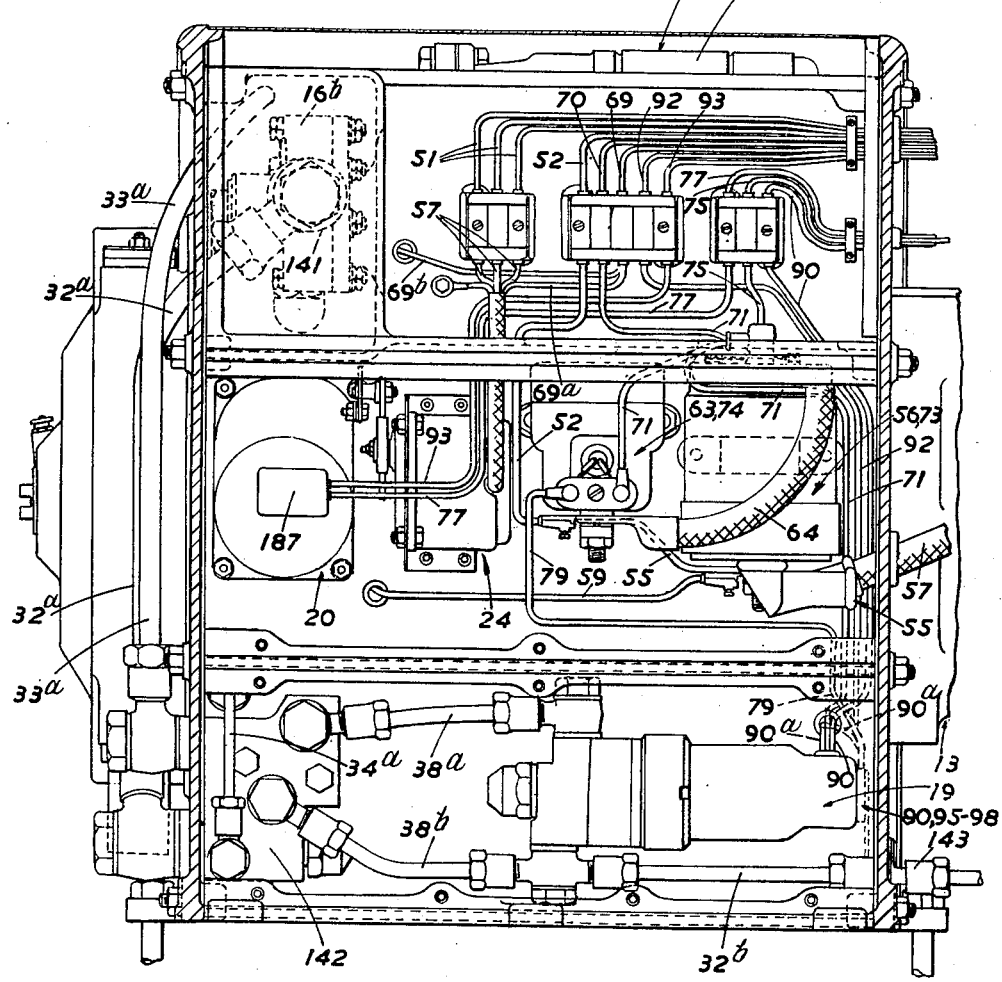

Inventor
R. F. Worlidge
By Watson, Cole, Grindle & Watson
Attorney

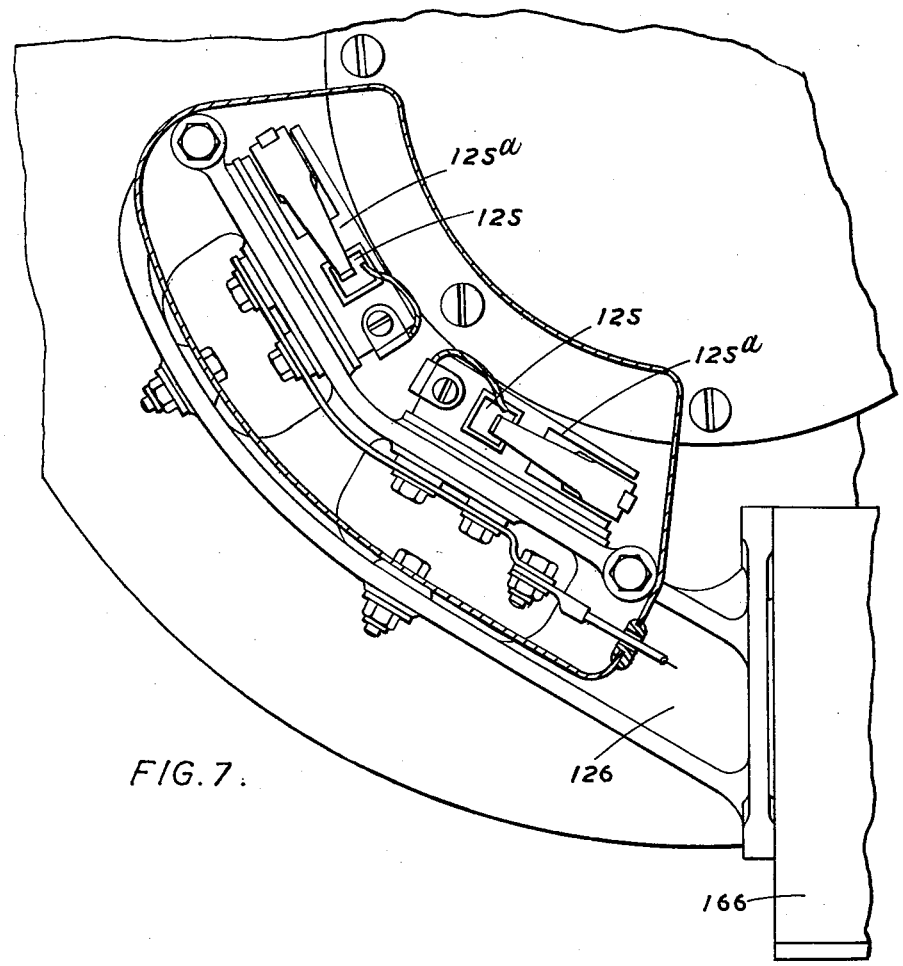
FIG. 7.
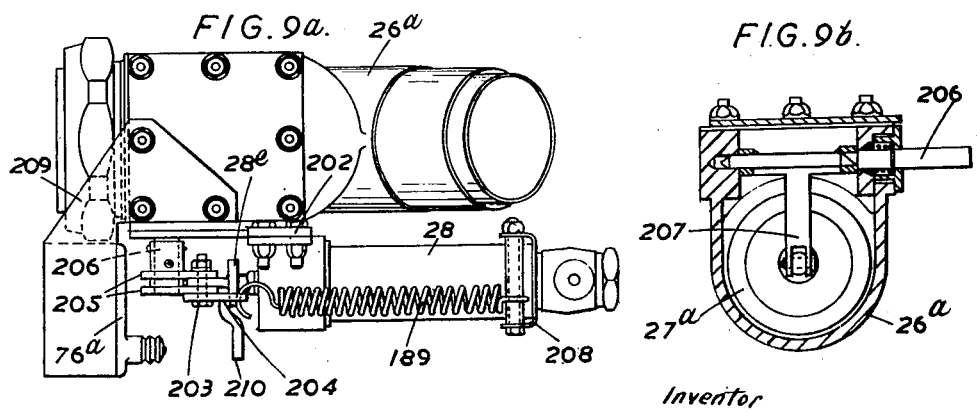
FIG. 9a.
FIG. 9b.
Inventor
R. F. Worlidge
By Watson, Cole, Grindle & Watson
Attorney

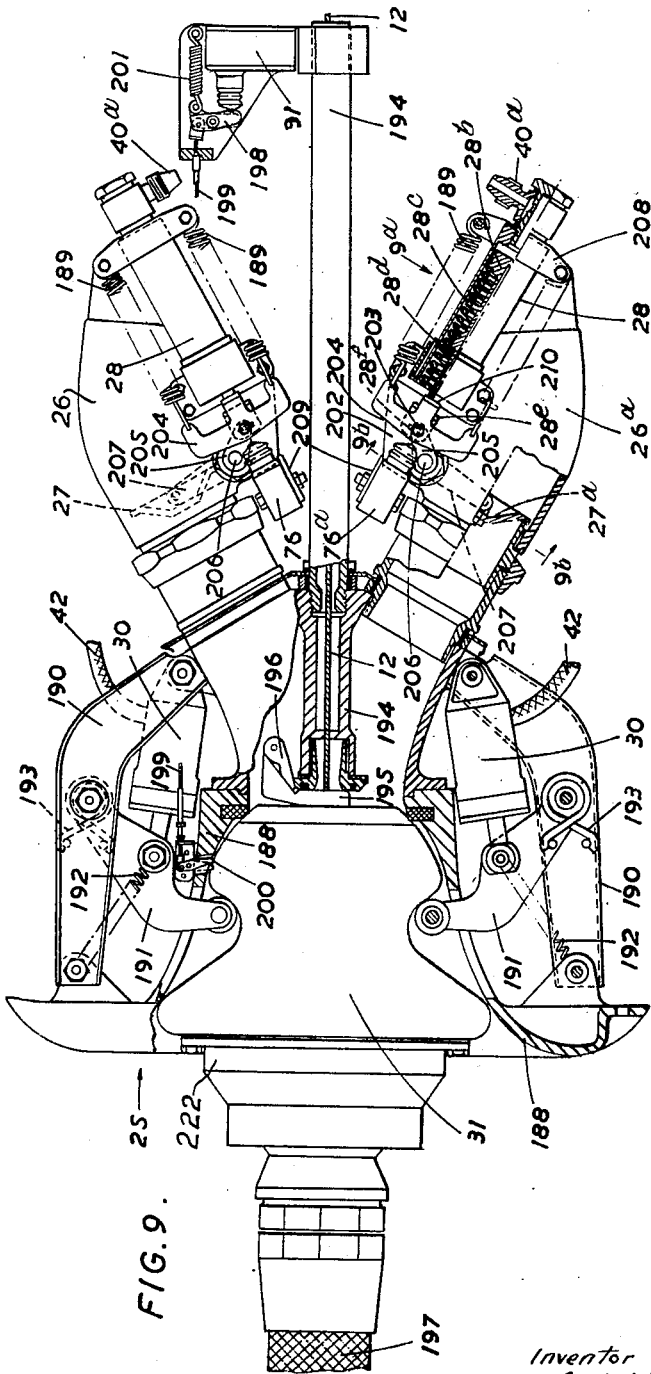

April 14, 1953  R. F. WORLIDGE  2,634,926
APPARATUS FOR INSTALLATION IN AIRCRAFT
FOR RECEIVING FUEL AND OTHER LIQUIDS
IN FLIGHT AND CONTROL MEANS THEREFOR
Filed Jan. 17, 1950  15 Sheets-Sheet 13

Inventor
Ronald F. Worlidge
By Watson, Cole, Grindle & Watson
Attorney

April 14, 1953 R. F. WORLIDGE 2,634,926
APPARATUS FOR INSTALLATION IN AIRCRAFT
FOR RECEIVING FUEL AND OTHER LIQUIDS
IN FLIGHT AND CONTROL MEANS THEREFOR
Filed Jan. 17, 1950 15 Sheets-Sheet 14

Inventor
Ronald F. Worlidge
By Watson, Cole, Grindle & Watson
Attorneys

April 14, 1953 R. F. WORLIDGE 2,634,926
APPARATUS FOR INSTALLATION IN AIRCRAFT
FOR RECEIVING FUEL AND OTHER LIQUIDS
IN FLIGHT AND CONTROL MEANS THEREFOR
Filed Jan. 17, 1950 15 Sheets-Sheet 15

Inventor
Ronald F. Worlidge
By Watson, Cole, Grindle & Watson
Attorneys

Patented Apr. 14, 1953

2,634,926

UNITED STATES PATENT OFFICE 2,634,926

APPARATUS FOR INSTALLATION IN AIRCRAFT FOR RECEIVING FUEL AND OTHER LIQUIDS IN FLIGHT AND CONTROL MEANS THEREFOR

Ronald Frederick Worlidge, Bognor Regis, England, assignor to Flight Refueling Limited, London, England, a British company Application January 17, 1950, Serial No. 138,954
In Great Britain January 18, 1949

18 Claims. (Cl. 244—135)

1

This invention relates to apparatus for transferring liquid in bulk from one aircraft to another in flight, more especially for refuelling, and in which the part of the apparatus which is mounted in the "receiver," i. e. the aircraft to which liquid is to be transferred, comprises an externally exposed coupling element referred to as a "nozzle-coupling," having a liquid passage and stop-valve therein and provided with latching means for engaging a necked nozzle element attached to the end of a hose trailed by the "tanker," i. e. the aircraft from which liquid is to be transferred, and holding said nozzle element in liquid-tight engagement with the nozzle-coupling, the nozzle element being permanently mounted on the hauling line and detachably connectible to the hose.

An object of the invention is to render the operation of this apparatus largely automatic, the intervention of the operator—a member of the receiver's crew—for controlling the operations being reduced to the mere initiation of required sequences of actions, which are then effected automatically.

A further object is to enable the necessary minimum of manual control to be exercised remotely without actual handling of the mechanism; and at the same time to provide the operator with appropriate visual indications of the state and operation of the apparatus.

Another object is the provision of automatic safeguards for protecting the apparatus and reducing fire hazard in certain circumstances, especially in the event of an "emergency breakaway," i. e. unintentional disconnection of the hose and nozzle element from the nozzle-coupling during refuelling, owing e. g. to loss of formation between the tanker and receiver, the toggle means being constructed to release the nozzle element on a critical load in the hose being exceeded.

How the foregoing objects and others as will hereinafter appear are accomplished will be seen from the following description, having reference to the accompanying drawings illustrating by way of example a preferred manner of carrying out the invention, without limitation of the scope thereof, which is defined in the appended claims.

In the drawings,

Figures 1 and 1ª, which is a continuation of Figure 1, are a pictorial circuit diagram of the installation in a "receiver" aircraft;

Figure 2 is a plan view, with the cover removed, of the power unit;

Figures 3 and 3ª, which is a continuation of Figure 3, are a stepped plan section of part of the power unit;

2

Figure 4 is an end elevation, partly in section, of the power unit, as seen from the left of Figure 2;

Figure 5 is a side elevation of the power unit with the cover removed to expose the contents as seen from the right of Figure 4;

Figure 7 is a detail view showing the brush gear as seen in elevation from the left of Figures 2 and 3;

Figure 9 is a plan view, partly in axial section, of the nozzle-coupling with the nozzle in position for transferring fuel;

Figure 9ª is a partial elevation viewed in the direction of arrow 9ª of Figure 9;

Figure 9ᵇ is a sectional view on the line 9ᵇ—9ᵇ of Figure 9.

Figure 10:
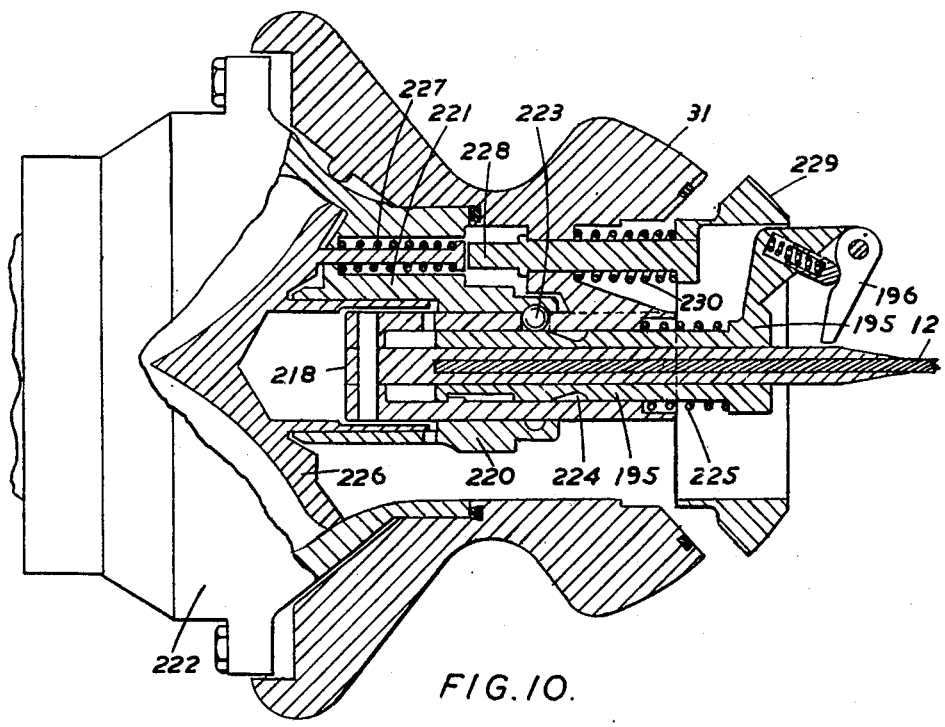
Figure 18:
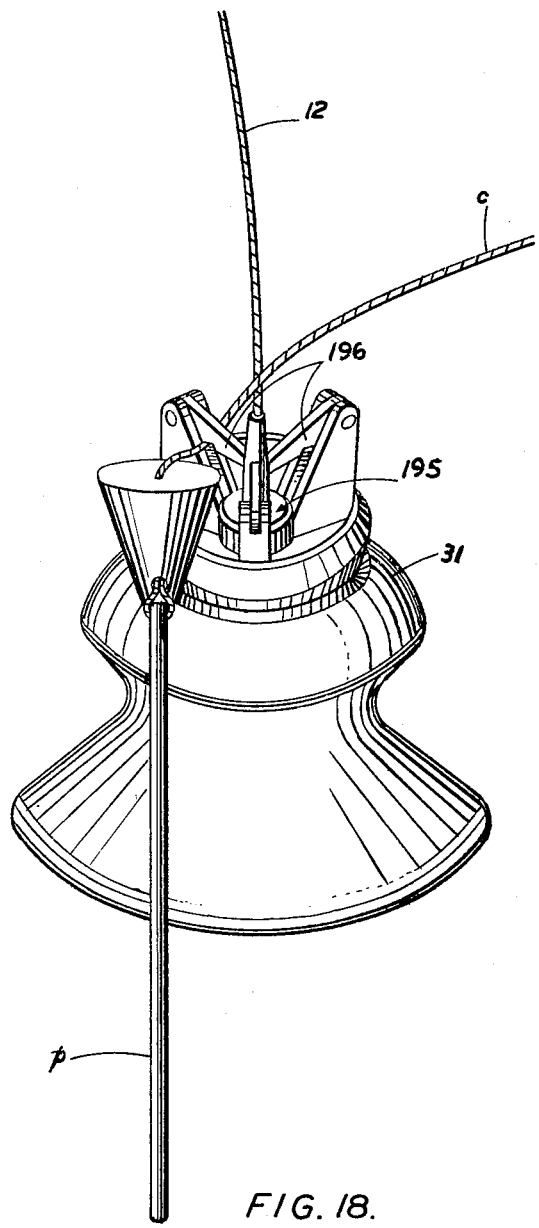

Figure 10 is an enlarged view, partly in axial section, of the nozzle and its attachment to the hauling line and to the refuelling hose;

Figures 11 to 17 illustrate diagrammatically successive stages in the flight refuelling operation using the apparatus illustrated in Figures 1 to 10, and 18; and Figure 18 is a perspective view of the hauling line and nozzle of the receiver aircraft with the grapnel thereof engaged with the contact line and "projectile" of the tanker aircraft.

Figure 1A:
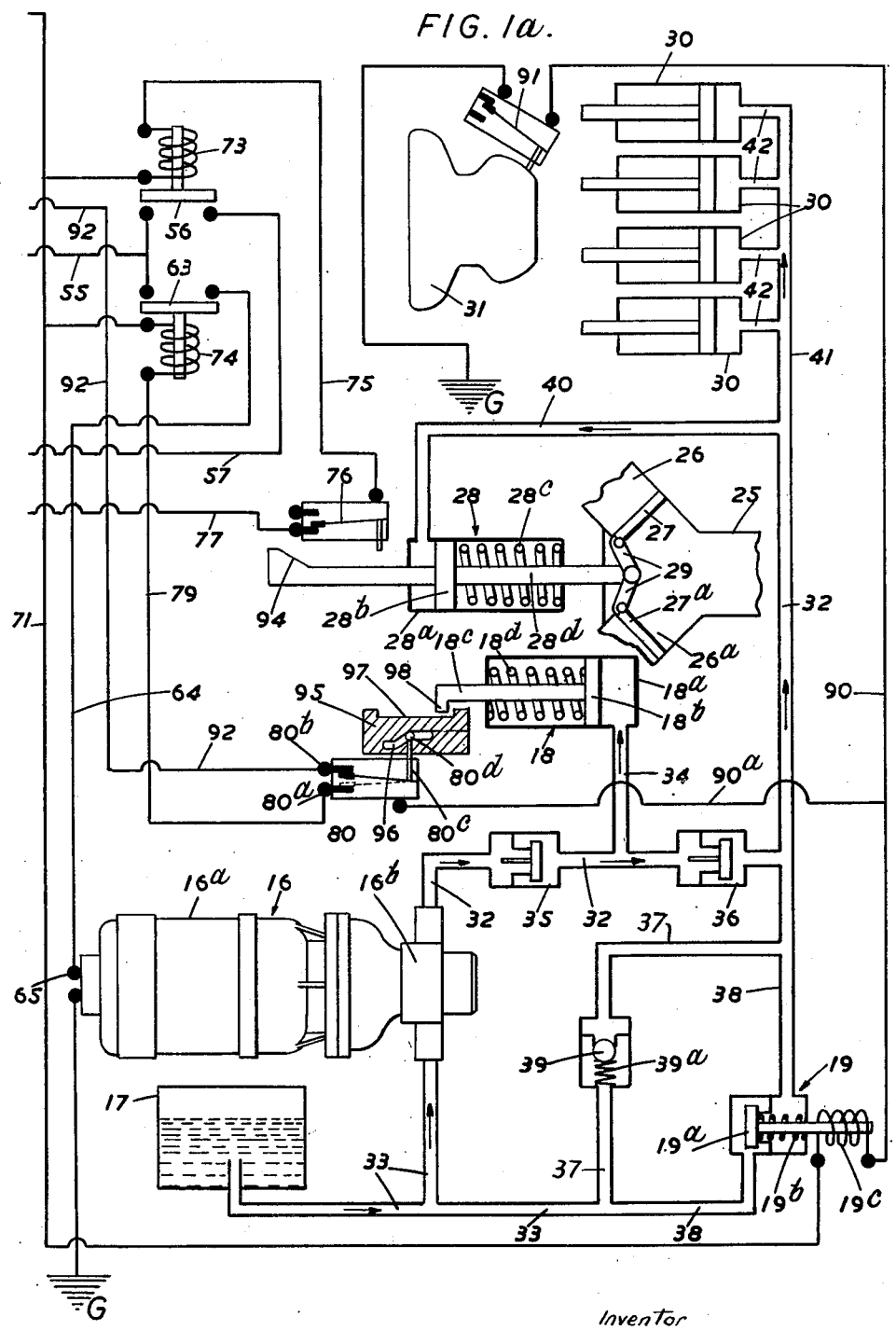

The general arrangement of the system, as shown in Figures 1 and 1ª, will first be described. The system includes the following structural and mechanical components: a power unit 10 (see Figures 2 to 7) in which are housed a windlass 11 on which is reeled a hauling line 12, a windlass-driving electric motor 13, connected to the windlass by a dog clutch 14, which is spring-loaded to disengage and is engageable by an electro-magnet 15, a device 43 for locking the windlass schematically represented in Figure 1 by a pin engageable by spring means (not shown) in an opening in the rim of the windlass drum and disengageable by a solenoid 44 (see also Figure 2), a motor-pump unit 16 comprising an electric motor 16ª coupled to a hydraulic pump 16ᵇ, a hydraulic reservoir 17, a hydraulic pressure accumulator 18 comprising a cylinder 18ª, piston 18ᵇ, piston rod 18ᶜ and spring 18ᵈ, a solenoid-valve component 19, a governor 20 driven by the windlass through worm-gearing 21, 22 and a shaft 23, which also drives the transmitter 24 of a distant-reading electrical counter device for indicating to the operator length of hauling line paid out, together with other items not shown in Figures 1 and 1ᵃ; a nozzle-coupling 25 (see also Figure 9), having a fuel passage with two branches 26, 26ᵃ each provided with a stop-valve 27, 27ᵃ; a stop-valve-operating hydraulic jack 28 having a cylinder 28ᵃ, piston 28ᵇ, valve-closing spring 28ᶜ, and piston rod 28ᵈ connected to the valves 27, 27ᵃ by links 29; and latch-engaging jacks 30 operative to engage latches (not shown in Figure 1ᵃ, but see Figure 9) with the neck of a nozzle 31 and secure it in the nozzle-coupling, the nozzle being permanently mounted on the end of the hauling line 12 and being provided with means hereafter referred to for attaching it to a hose paid out from the tanker aircraft. The nozzle can be hauled into the nozzle-coupling by means of the hauling line 12, which passes through a fairlead in the centre of the nozzle-coupling; and the latches are disengageable by spring means as shown in Figure 9.

The hydraulic circuit comprises a pressure main 32 connected to the delivery side of the pump 16ᵇ, a suction main 33 connected to the suction side of pump 16ᵇ and to the reservoir 17, a branch 34 connecting the pressure main to the accumulator 18, non-return valves 35, 36 in the pressure main on either side of the connection to the accumulator branch 34, and by-passes 37, 38 connecting the pressure and suction mains, the former containing a relief-valve 39 normally closed by a spring 39ᵃ and the latter a control valve 19ᵃ loaded to open by a spring 19ᵇ and closable by a solenoid 19ᶜ, the valve and the solenoid together constituting the solenoid-valve component 19. The pressure main 32 is connected by a branch 40 with the valve-operating jack 28 and by a continuation pipe 41 having branches 42 with the latch engaging jacks 30. The arrows in Figure 1ᵃ indicate the direction of flow when the pump 16ᵇ is working with the control valve 19ᵃ closed. The pipes 40, 41 are provided with restrictors (not illustrated) which ensure that the stop-valves 27, 27ᵃ open more slowly than the latches engage.

The system is remotely controlled and its operation monitored by switch and indicator means mounted on a control panel 45 (see also Figure 8) and comprising a ganged three-position master switch 46, a main indicator lamp 47, a "hydraulic" indicator lamp 48, an "emergency break-away" indicator lamp 49 and a "hauling line indicator" 50 having a scale 50ᵃ and pointer 50ᵇ indicating the length of hauling line paid out and constituting the receiver which is electrically connected to the transmitter 24 by conductors 51.

The electrical circuits (see also Figures 5 and 8) are shown as wired on the single pole system with ground return as indicated at G. The positive feed, indicated at + is connected to a positive main 55 having a parallel branch 52. Branch 52 is connected by conductors 52ᵃ, 52ᵇ to the two ganged moving contacts 53, 54 of the master switch 46, and the main 55 is connected through a switch 56 with parallel conductors 57, 59, conductors 57 being connected to the input terminal 58 of the windlass motor 13 and conductor 59 to the input terminal 60 of the clutch magnet 15 to which the current is passed by means of a brush 61 and a slip ring 62. The main 55 is further connected through a switch 63 with the input terminal 65 of the pump motor 16ᵃ.

The master switch 46 has three fixed contacts 66, 67, 68. In one position, called "off" both arms 53, 54 are clear of all fixed contacts and all circuits are open; in a second position, called "trail," arm 53 is clear of fixed contacts and arm 54 is closed on contact 66, and in the third position, called "wind" arm 53 is closed on contact 68 and arm 54 on contact 67. Contacts 66, 67 are both connected to a conductor 69 and contact 68 to conductors 71, 72. Therefore in the "wind" position conductors 69, 71, 72 are all alive and in the "trail" position only conductor 69 is alive.

Conductor 69 has two parallel branches 69ᵃ, 69ᵇ of which branch 69ᵇ is connected to the solenoid 44 which when energised withdraws the pin 43 from the windlass drum to release the windlass; and branch 69ᵃ is connected to the transmitter 24 to energise the latter and cause it to transmit impulses by means of the conductors 51 to the receiver in the indicator 50 to move the pointer 50ᵇ so as to indicate the length of hauling line paid out. The circuit through branch 69ᵃ and the transmitter 24 is completed by a ground connection 70. The construction of the transmitting and receiving elements of this device is not illustrated or described as many successful systems are well known and the details of this distant-reading indicator are not per se part of the invention. Furthermore, conductor 69 is connected to the main indicator lamp 47. Therefore, when the switch 46 is in the "trail" or "wind" position the lamp 47 is illuminated, the windlass is free and the hauling line indicator is operating.

To conductor 72 the indicator lamps 48, 49 are connected in parallel.

Conductor 71 is connected to three solenoids, viz. solenoid 19ᶜ which closes valve 19ᵃ, solenoid 73 which closes switch 56 and solenoid 74 which closes switch 63.

The return path from solenoid 19ᶜ is by way of a conductor 90 which is grounded through a switch 91. The return path from solenoid 73 is by way of a conductor 75, a switch 76 and a conductor 77 connected to one fixed contact 78ᵃ of a two-way switch 78, of which the moving contact is grounded. The return path of solenoid 74 is by way of a conductor 79 connected to one fixed contact 80ᵃ of a two-way switch 80, the moving contact of switch 80 being connected to the conductor 90 by means of a conductor 90ᵃ. The second contact 80ᵇ of the switch 80 is connected by a conductor 92 to the hydraulic indicator lamp 48, the circuit through which is completed to ground through conductors 92 and 90 and switch 91 when the moving contact of switch 80 is closed on the fixed contact 80ᵇ. Thus, completion of the circuit through solenoid 19ᶜ requires only that the switch 91 be closed, whereas completion of the circuit through solenoid 73 requires closure of the switch 76 and closure of the switch 78 on the fixed contact 78ᵃ, and completion of the circuit through solenoid 74 requires closure of the switch 80 on contact 80ᵃ as well as closure of the switch 91. Switch 91 is mounted on the nozzle-coupling 25 and is closable by the nozzle 31 on entering the coupling (see also Figure 9). Switch 76 is arranged to be normally closed but to be opened when the stop-valves 27, 27ᵃ of the nozzle-coupling 25 are fully opened, the actuating means being diagrammatically represented in Figure 1ᵃ by a ramp 94 on the piston rod 28ᵈ of the jack 28 and so disposed as to open the switch 76 when the piston 28ᵇ of the jack reaches the position in which the valves 27, 27ᵃ are fully open. Switch 78 is operated by the governor 20; it is normally closed on the contact 78ᵃ, but when the speed of the windlass exceeds a critical value the governor shifts the moving contact 78 from the fixed contact 78ᵃ to the other fixed contact 78ᵇ of the switch to close the circuit through the "emergency break-away" indicator lamp 49 through a conductor 93 and conductor 72.

The two-way switch 80 is operated by the hydraulic accumulator 18 through a lost motion connection diagrammatically represented in Figure 1ᵃ by a longitudinally slidable bar 95 having a cam-slot 96 engaging a pin 80ᵈ on a link 80ᶜ connected to the moving contact of switch 80 and an elongated recess 97 engageable with a projection 98 on the end of the piston rod 18ᶜ of the accumulator 18. When the accumulator is fully discharged and the spring 18ᵈ is fully extended, projection 98 engages the right hand end of the recess 97 and causes the cam-slot 96 and link 80ᶜ to throw the moving contact of switch 80 onto the fixed contact 80ᵃ completing the circuit of the solenoid 74 through conductors 79 and 90 and switch 91. When the accumulator 18 is filled with hydraulic fluid by the pump 16ᵇ the piston 18ᵇ moves to the left, as seen in Figure 1ᵃ, compressing the spring 18ᵈ, but the bar 95 is not moved from the position in which the moving contact of switch 80 is closed on contact 80ᵃ until the pressure in the accumulator 18 has reached an upper predetermined limit, compressing the spring 18ᵈ and causing the projection 98 to meet the left hand end of the recess 97 and move the bar 95 to the left, as seen in Figure 1ᵃ, thereby causing the cam-slot 96 and link 80ᶜ to return the moving contact of switch 80 to the fixed contact 80ᵇ. Similarly, when the accumulator 18 discharges, the moving contact of switch 80 remains closed on the fixed contact 80ᵇ until the pressure in the accumulator reaches a predetermined lower limit. Thus, when the accumulator becomes charged, the circuit through solenoid 34 is broken and the switch 63 is opened to de-energise the motor pump unit 16 and the hydraulic indicator lamp 48 is illuminated; and the motor pump remains inoperative and the hydraulic indicator lamp illuminated until the accumulator becomes discharged. It will be noted that the accumulator-operated switch 80 does not affect the action of the solenoid 19ᶜ which remains energised to close the valve 19ᵃ and retain pressure in the hydraulic connection 32, 34, 40, 41 as long as the input conductor 71 is energised and the switch 91 in the ground return circuit through conductor 90 is closed.

The construction of the power-unit 10 is illustrated in Figures 2 to 7. It comprises a casing assembly including a casting 99, end plates 100, 101 and sheet metal cover plates 102, 102ᵃ. The casting 99 has webs 99ᵃ, 99ᵇ forming internal partitions. The end plate 101 is dished inwards (see Figure 3) and is formed with a hollow central boss 101ᵃ to the outer face of which the motor 13 is secured by studs 104. Boss 101ᵃ carries a bearing 105 on which the windlass drum 11 is supported coaxially with the motor, and a second bearing 106 (see Figure 3ᵃ) carried in a boss 100ᵃ of the end plate 100 supports a hollow shaft 11ᵃ having a dished flange 11ᵇ bolted to the drum 11.

The motor is connectible to the windlass by means of a dog-clutch (see Figure 3) of which one dog 107 is fast on the motor shaft and the other 108 has a short shaft slidable on splines in a boss 109 bolted to the drum 11, and is urged to disengaged position by a compression spring 110 trapped between the boss 109 and an abutment plate 111 secured to the shaft of the dog 108 by a stud 112. The dogs 107, 108 have buttress teeth whose driving faces *d* are slightly laid-back to facilitate disengagement, the rear faces *r* being inclined at a small angle to the radial plane to facilitate engagement. The dog 108 is engageable with dog 107 by means of an electro-magnet comprising an iron-circuit member 113 having integral lugs 113ᵃ by which it is bolted to the drum 11 and enclosing an annular winding 114, the armature of the magnet being constituted by a control plug 115 secured by an adjusting screw 116 to a thimble 117 axially slidable in the member 113 to bear on the head of stud 112. The movement of the armature is limited in the disengaging direction by the end face of shaft 11ᵃ and in the engaging direction by the member 113, and the screw 116 enables the relative positions of the armature 115 and dog 108 to be correctly adjusted to ensure that the dogs 107, 108 are fully engaged when the armature meets the member 113 to close the magnetic circuit. The ends of the winding 114 are respectively connected to a conductor 118 grounded to the drum shaft flange 11ᵇ and to an input conductor 119 connected by a stud 120 and washer 121 to a slip-ring 122 secured to the flange 11ᵇ by studs 123 carrying insulating bushings 124. Brushes 125 (see Figure 7) carried in insulating holders 125ᵃ mounted on a bracket 126, which is bolted to the box 166 hereinafter mentioned (see Figure 3ᵃ), convey the input current to the slip-ring 122.

In Figure 1 the windlass-locking device is schematically represented by a pin 43 entering an opening in the rim of the windlass drum. This arrangement would be harsh in operation and would cause damage if the master switch were inadvertently thrown into the "off" position while the windlass was turning. In the actual construction (see Figure 2) the locking device is constituted by a friction pad 43ᵃ pressed against the rim of the windlass drum 11 by a spring 44ᵇ abutting on a housing 44ᵃ secured to the casing end plate 100 and enclosing the solenoid 44 (see Figure 1) which withdraws the pad 43ᵃ when energised.

Figure 3A:
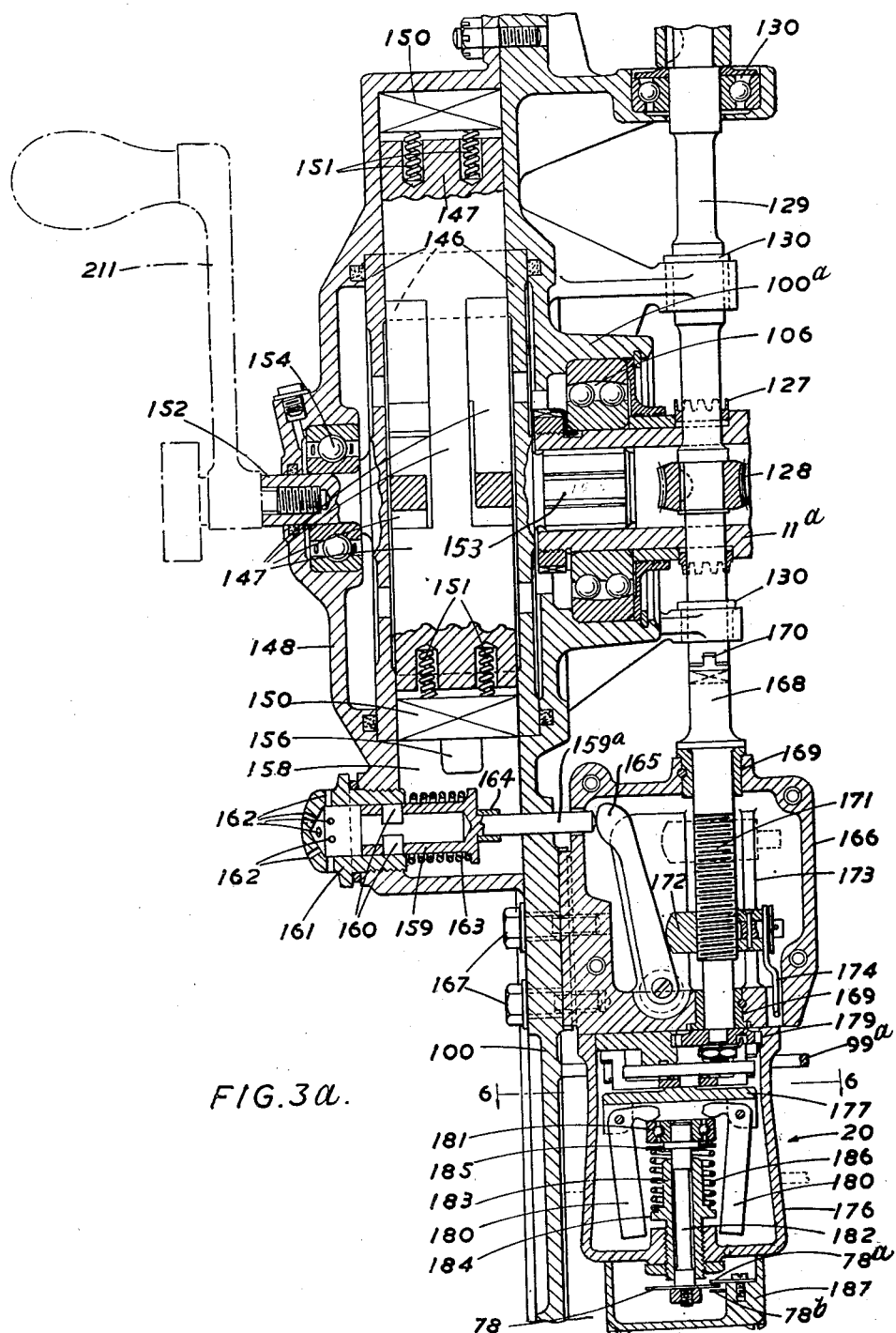

Shaft 11ᵃ is provided with a worm 127 meshing with a worm wheel 128 on a shaft 129 supported in bearings 130 carried in brackets formed integrally on the casing end plate 100 (see Figure 3ᵃ). Shaft 129 drives a serving gear for laying the hauling line 12 onto the windlass drum evenly. A bevel pinion 131 on the end of shaft 129 drives a bevel pinion 132 on a shaft 133, parallel to the windlass drum axis and supported in bearings in the casing end plates 100, 101, the shaft 133 having right and left hand Archimedean screw threads 134 engaged by a slipper (not shown) carried in an extension 135 of a housing 136, which is slidably supported on a guide 137 secured at each end to the casing end plates 100, 101. Housing 136 supports freely rotatable grooved rollers 138 and guide pins 139 between which the hauling line passes. When the windlass rotates the Archimedean screw 134 causes the above-mentioned slipper and the housing 136 to travel back and forth along the guide 137 to lay the hauling line evenly on the drum 11.

The reservoir 17 is mounted above the windlass with the motor-pump unit 16 alongside it. A double banjo 140 connects the suction inlet of the pump 16ᵇ to a suction stand-pipe 33ᵇ in a reservoir and to the return line 33ᵃ of the hydraulic system while the delivery outlet of the pump is connected by a banjo 141 to the pressure main 32ᵃ. The pressure and suction lines 32ᵃ, 33ᵃ are connected to a junction box 142 containing the non-return valves 35 and 36 and relief valve 39 of Figure 1ª (not shown in Figures 2, 4 and 5), and having connections to the hydraulic accumulator 18 by means of a pipe 34ª and to the solenoid valve component 19 (see Figure 5) by pipes 38ª, 38ᵇ, the latter being also connected to a pipe 32ᵇ terminating in a union 143 for connection to a hydraulic service line (not illustrated), which feeds the toggle-engaging jacks 30 and stop-valve-opening jack 28 (Figures 1ª and 9). The junction box 142, pipes 38ª, 38ᵇ and 32ᵇ and the solenoid valve unit 19, the casing of which encloses the control valve 19ª, spring 19ᵇ and solenoid 19ᶜ of Figure 1ª (not shown in Figure 5), are housed in a compartment 144 of the main casing shown at the bottom right hand corner of Figure 4 and in Figure 5, the accumulator 18 (see Figure 4) being in the main compartment next to compartment 144, and the accumulator operated switch 80 and operating mechanism 95—98 of Figure 1ª (not shown in Figure 4) being enclosed in the casing of the accumulator.

Since the actual hydraulic circuit illustrated in Figures 2, 4 and 5 differs in detail from that diagramatically illustrated in Figure 1ª, though functionally equivalent, distinguishing affixes *a* and *b* are applied to corresponding reference numerals in Figures 2, 4 and 5. Thus parts 32ª and 32ᵇ (Figures 2, 4 and 5) correspond to part 32 of Figure 1ª and so forth.

The windlass is provided with a brake in the form of a displacement air-compressor of the vane pump type (see Figures 3ª and 4) of which the rotor is constituted by a hub 146 carrying radially slidable vanes 147, and the stator by a housing 148 secured to the outside of the casing end plate 100 and enclosing a chamber 149 in which the rotor rotates eccentrically with the vanes sweeping the internal peripheral wall of the chamber, the clearance between each vane and the chamber-wall being sealed by strips 150 radially slidable in the vane and pressed outwards by springs 151. The hub 146 has integral stub shafts 152, 153, the outer stub shaft 152 being supported by the housing 148 in a bearing 154 and the inner stub shaft 153 being connected by a splined joint with the windlass extension shaft 11ª. The housing 148 is peripherally grooved internally to form inlet and outlet manifolds 155, 156, the former connected with an atmospheric opening 157, and the latter with a relief valve comprising a seating 212, a valve-needle 213, apertured cover 214, spring 215, spring abutment 216, and abutment-adjusting screw 217. A pocket 158 communicating with the outlet manifold contains a variably throttling outlet valve (see Figure 3ª) comprising a hollow, open-ended piston 159 having ports 160, and a thimble 161 having atmospheric vents 162, in which thimble the piston slides. The piston 159 is biased to a position, in which the ports 160 are uncovered thus venting the chamber 149 freely to atmosphere, by a compression spring 163 trapped between the thimble 161 and a flange on the piston 159. The piston 159 also has an integral stem 159ª slidably supported in the casing end plate 100 and engageable by the end of a lever 165 pivotally mounted in a box 166 secured to the inner face of the plate 100 by studs 167; and when the piston is moved by the lever 165 against the effort of spring 163, the ports 160 are progressively closed, thus progressively throttling the outlet of the vane-pump 146—151 and thereby increasing the resisting torque on the windlass at any given speed of the latter. A tubular distance piece 164 mounted on stem 159ª limits the displacement of the piston 159 under the effort of spring 163.

A shaft 168, supported in the box 166 in bearings 169 coaxially with shaft 129 and driven thereby through dogs 170, has formed thereon a lead-screw 171, with which a nut 172 is in threaded engagement. A guide rib 173 prevents the nut from rotating. When the hauling line 12 is fully wound in, the nut 171 is in the position shown in dotted lines in Figure 3ª. As the hauling line is paid out the rotation of shaft 129, 168 causes the nut to travel down the lead-screw 171, the displacement of the nut being proportional to the length of hauling line paid out. When a predetermined length of line has been paid out the nut reaches a position in which it meets the lever 165 and further advance of the nut as the hauling line continues to pay out causes the lever 165 to be rocked counterclockwise to close the ports 160 of the outlet valve 159—162 progressively. Since the lever 165 is disposed at an acute angle to the axis of the lead-screw 171 and so orientated that as the nut 172 advances in contact with it this angle increases, the rate at which the valve ports 160 close relatively to the rate of advance of the nut increases progressively. The resisting torque imposed by the vane-pump on the windlass is therefore negligible until the nut 172 reaches the lever 165 and thereafter increases progressively at an increasing rate as the nut advances. For any given position of the valve piston 159, this resisting torque is approximately proportional to the square of the paying out speed of the windlass, so that the latter experiences no substantial resistance when turning slowly.

Owing to the positions of the outlet and relief valves and the inlet opening the vane-pump is only operative when the rotor 146 rotates counterclockwise as seen in Figure 4 corresponding to rotation of the windlass in the direction for paying out the hauling line. When the latter is being wound in the rotor 146 rotates anticlockwise and the inlet 157 becomes an unobstructed outlet, so that no appreciable resistance is imposed on the windlass irrespective of whether the ports 160 are open or closed.

The nut 172 also serves as a counter for the length of hauling line paid out and is connected by a link 174 (see also Figure 5) with the transmitter 24 of the distant reading hauling line indicator (see Figure 1), the transmitter 24 being housed in a compartment 175 of the casing 99—102.

Compartment 175 also houses the governor 20 which comprises a housing 176 secured to the box 166 and enclosing a rotary carrier 177 driven through speed multiplying gearing by shaft 168 and having pivoted thereon flyweights 180, the toes of which engage the outer race of a bearing 181, whose inner race is fast on a shaft 182 slidable in a thimble 183 screwed into a housing 176 and having a spring abutment collar 184 between which and an abutment plate 185 fast on the shaft 182 is trapped a compression spring 186.

Figure 6:
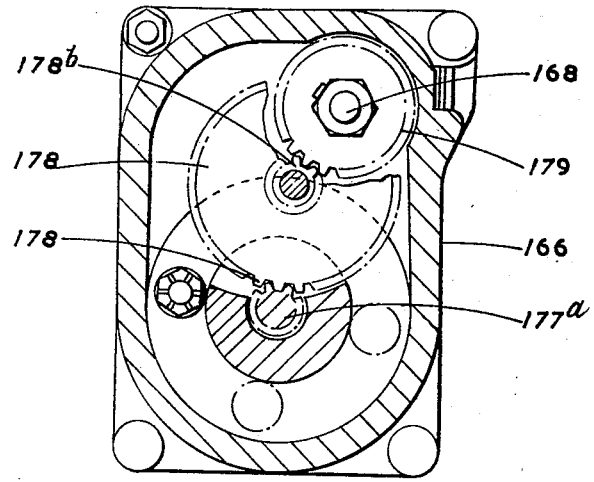
Figure 6 is a detail sectional view on the line 6—6 of Figure 3ª.
Figure 8:
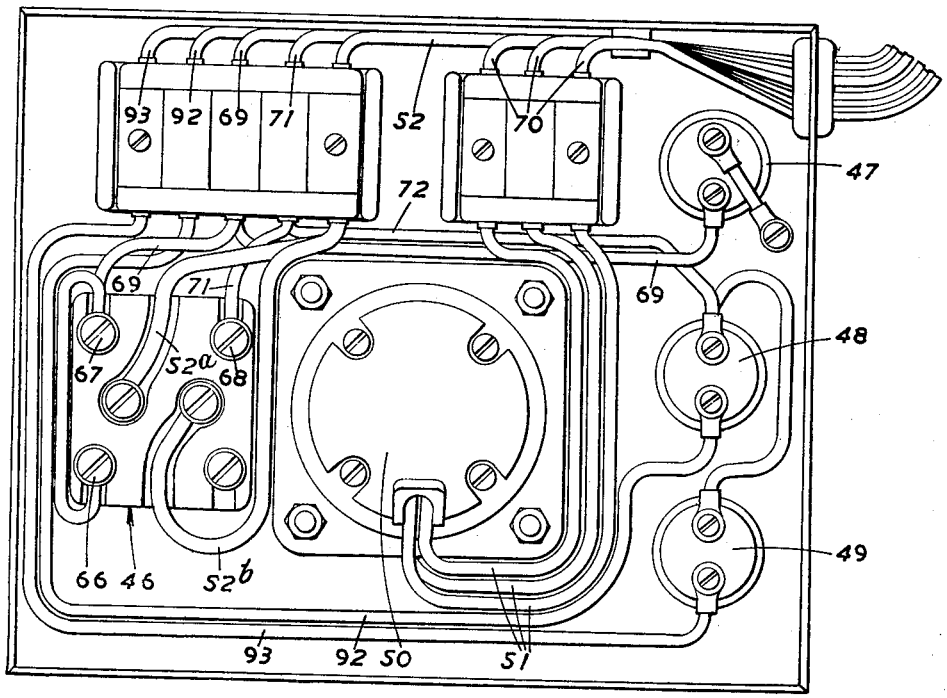
Figure 8 is a rear view of the control panel.

The gearing by which the carrier 177 is driven comprises a pinion 179 fast on the end of shaft 168, a pinion 177ª integral with the carrier 177, and an idler gear 178 having a large diameter gear element 178ª meshing with pinion 177ª and a small diameter gear element 178ᵇ meshing with pinion 179 (see Figure 6).

On the end of the housing 176 is attached a switch box 187 enclosing a switch comprising the moving contact 78 which is secured to the end of shaft 182 and grounded therethrough, and the two fixed contacts 78ᵃ and 78ᵇ (see Figure 1) the contact 78 being normally closed on contact 78ᵃ, but displaced by the flyweights 180 against the effort of spring 186 to leave contact 78ᵃ and close on contact 78ᵇ when the windlass exceeds a critical speed.

A detachable handle 211 (see Figure 3ᵃ) is provided, which can be fitted to the end of shaft 152 for the purpose of operating the windlass 11 by hand when power is not available, e. g. for unwinding and re-winding the hauling line 12 for inspection purposes.

Figures 9, 9ᵃ and 9ᵇ illustrate the nozzle-coupling and nozzle and associated details. The coupling 25 comprises a nozzle-receiving bell 188 to which is connected a fuel conduit having two branches 26, 26ᵃ in which are arranged stop-valves constituted by flaps 27, 27ᵃ. Secured to each branch of the fuel conduit by means of a bracket 202 is a hydraulic jack 28, of which the piston 28ᵇ is loaded by a compression spring 28ᶜ. A union 40ᵃ on the head of each jack 28 connects the latter to a branch, corresponding to branch 40 of Figure 1ᵃ, of the hydraulic service line (not shown) connected to union 143 of Figure 5. Admission of hydraulic pressure to the jack extends it against the effort of spring 28ᶜ. The piston rod 28ᵈ of each jack terminates in a fitting 28ᵉ which is slotted at 28ᶠ to receive a bolt 203 which connects a yoke 204 to a lever 205. Yoke 204 is connected to an anchorage plate 208 secured to the head of the jack by tension springs 189 which assist the effort of spring 28ᶜ in shortening the jack. Lever 205 is mounted on a shaft 206 supported in bearings in the conduit-branch 26 or 26ᵃ and carrying an internal lever 207 on which the flap 27 or 27ᵃ is mounted. The flap valves 27, 27ᵃ are normally kept closed by the springs 28ᶜ, 189 but are opened by the jacks 28 when the latter extend on admission of hydraulic pressure.

In this constructional embodiment the switch 76 of Figure 1ᵃ is duplicated, a switch 76 being associated with valve 27 and a similar switch 76ᵃ with valve 27ᵃ. These switches are mounted on brackets 209 secured to the conduit-branches 26, 26ᵃ respectively and are engageable to cause them to open by integral projections 210 of the yokes 204 when the jacks 28 are fully extended and the valves 27, 27ᵃ fully opened. To ensure that the circuit 75, 77 (see Figure 1ᵃ) will remain closed until both valves 27, 27ᵃ are open, the switches 76, 76ᵃ are connected in parallel in the circuit 75, 77.

On the outside of the bell 188 are mounted brackets 190 on which are pivoted latch-levers 191. The ends of these levers can pass through slots in the bell to engage the neck of the nozzle 31 and draw the latter into and secure it in the nozzle-coupling 25. Tension springs 192 and coil springs 193 rock the latch-levers outwards to clear the nozzle 31 as it enters the coupling 25 and to allow it to leave the coupling, and hydraulic jacks 30 pivotally anchored on the coupling structure are connected to the latch-levers to rock them inwards to engage the nozzle, the jacks being arranged to shorten under application of fluid pressure to their working chambers. The jacks 30 are connected by pipes 42 with the hydraulic service line (not shown) which is connected to union 143 as mentioned above.

The nozzle-coupling 25 is provided with a central fairlead 194 through which the hauling line 12 is rove, and the end of the hauling line 12 is attached to the base of a tubular plug 218 formed integrally with the nozzle 31 to the body of which it is connected by radial webs 219 (see Figure 10). Plug 218 fits into a socket 220 formed integrally by means of radial webs 221 with a hollow nozzle-connector member 222 which is mounted on the end of the hose 197 and on the outside of which the nozzle 31 fits in a fluid-tight manner. The plug and socket coupling 218, 220 is provided with a ball-catch constituted by balls 223 lodged in radial openings of the plug 218 and engageable in an annular groove formed in the inner wall of the socket 220, and a tubular plunger 195 provided with a ball-receiving annular groove 224 mounted to slide in the plug 218 between limit stops. The plunger is loaded by a light spring 225 the effort of which must be overcome to slide the plunger into the ball-releasing position. The nozzle-connector member has a closure valve 226 normally held on its seating by springs 227 (see Figure 10), but which can be unseated by plungers 228 slidably mounted in the radial webs 219 of the nozzle and carrying a nozzle tip ring 229, which is pressed inwards against the effort of springs 230, to unseat the valve 226, when the nozzle 31 is drawn fully home into the nozzle-coupling 25 by the latch-levers 191, as shown in Figure 9. The exposed end of the plunger 195 is enlarged and carries hinged, spring-loaded grapnel arms 196.

The switch 91 (see Figure 1ᵃ) is mounted on the fairlead 194 behind the nozzle-coupling, and its external operating member 198 is connected to a "Bowden" cable 199, whose other end is connected to a trigger 200 pivoted on a bracket fixed to the outside of the bell 188 to project through a slot into the interior of the bell. A tension spring 201 acts on the external switch member 198 to move it to the position shown in dotted lines in which the switch 91 is open and to cause the trigger 200 to project into the bell 188 as shown in dotted lines. When the nozzle 31 is fully home in the bell 188, the trigger 200 is rocked into the position shown in full lines to close the switch 91, which is returned to the open position by spring 201 when the nozzle 31 leaves the nozzle-coupling 25.

The neck of the nozzle 31 is so shaped that the tension in the hose 197 continuously exerts a force on the latch levers opposed to the engaging force exerted by the jacks 30, and if the tension in the hose reaches a value at which the back-pressure exerted on the hydraulic system by the jacks 30 is sufficient to lift the relief valve 39 (see Figure 1ᵃ) and enable the jacks 30 to empty, the latch levers will rock outwards and release the nozzle.

Figure 11:
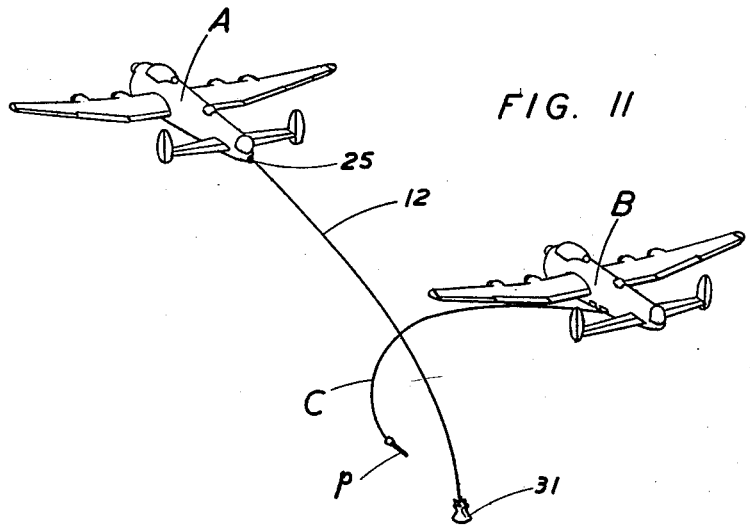
Figure 12:
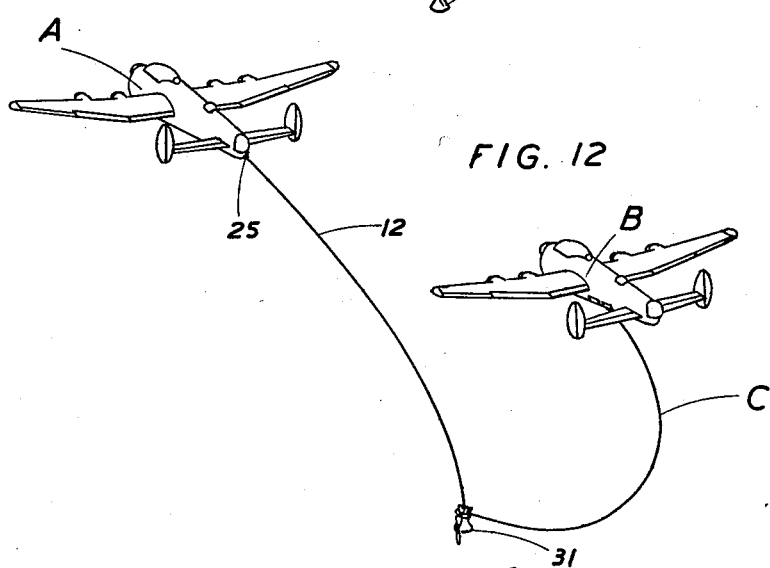
Figure 13:
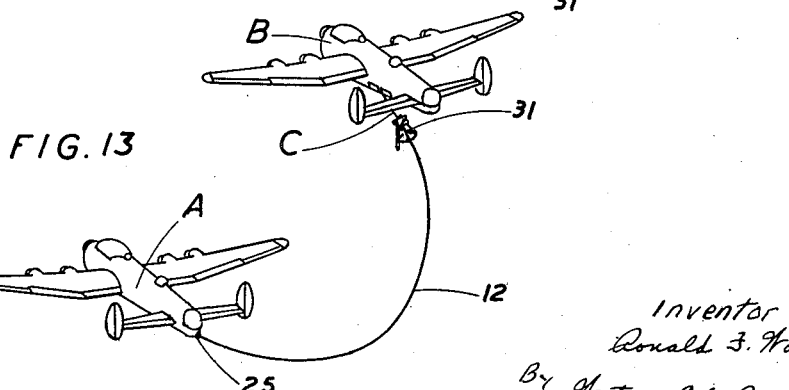
Figure 14:
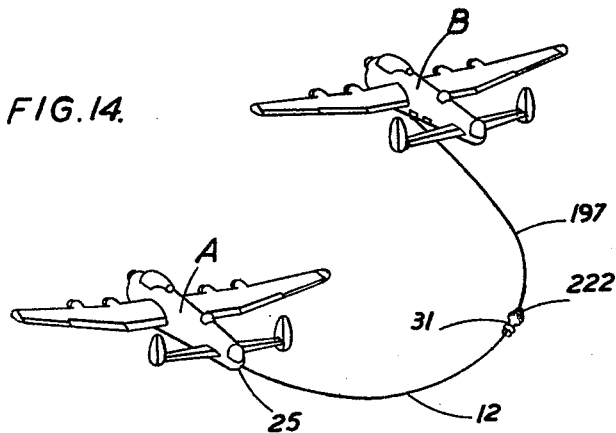
Figure 15:
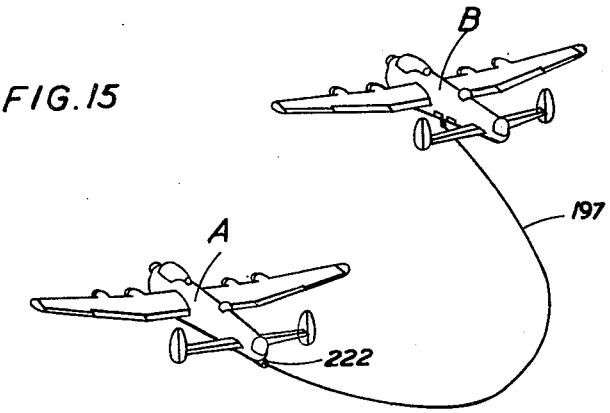

The operation of the system will now be described. Initially the master switch 46 is in the off position, rendering all the electrical circuits dead; all three indicator lamps 47, 48, 49 are extinguished, the hauling line indicator 50 is not functioning and the windlass 11 is locked by means of the device 43. On receipt of a signal from the tanker aircraft B (Figure 11) that it has taken up station and is ready to commence refuelling, the receiver's operator in the receiver aircraft A (Figure 11) places the master switch in the "trail" position, thus energising solenoid 44 to withdraw the device 43 and release the windlass, illuminating the main indicator lamp 47 and energising the distant-reading hauling line indicator system 24, 51, 50. The hauling line 12 is now free to pay out and is trailed, which it is caused to do by means of the nozzle 31 which acts as a sinker (Figure 11). After paying out a predetermined length of hauling line the airbrake 146—148 automatically slows down the windlass as hereinafter described in connection with the "emergency break-away." The crew of the tanker B then eject or pay out the contact line, which is armed with a terminal "projectile" $p$ (Figure 18) with an enlarged base across the path of the hauling line which traps the projectile of the contact line by means of the grapnel 196 (see Figures 12 and 18). The tanker crew then reel in the contact line (Figure 13) to bring the end of the hauling line carrying the nozzle 31 aboard the tanker where it is attached by means of the plug and socket coupling 218, 220 to the hose 197, which is then paid out by the tanker crew (Figure 14).

On receipt of the appropriate signal from the tanker, the receiver's operator places the master switch in the "wind" position, thus closing the relay circuit 68, 71, 73, 75, 77 of the windlass motor through switch 76 which is closed and through switch 78 which is closed on the fixed contact 78$^a$. This energises the solenoid 73 and thus closes the switch 56 to energise the windlass motor 13 and electromagnet 15, the latter causing the windlass clutch 14 to engage. The motor 13 then winds in the hauling line 12 until the nozzle 31, now connected to the hose 197, enters the nozzle-coupling 25 (Figure 15) and moves the trigger 200 to close the switch 91 (see Figure 9), thus completing the relay circuit 68, 71, 74, 79, 90$^a$, 90 of the motor-pump unit 16 through solenoid 74 and switch 80, which is closed on the fixed contact 80$^a$, to energise the solenoid 74 and close the switch 63 to start the motor 16$^a$, at the same time completing the circuit 68, 71, 19$^c$, 90 to energise the solenoid 19$^c$ and close the control valve 19$^a$ to isolate the pressure main and hydraulic service line (item 32 of Figure 1$^a$) from the return line 33. The motor 16$^a$ then drives the pump 16$^b$ to generate pressure in the pressure main and hydraulic service line and charge the hydraulic accumulator 18. When sufficient pressure has been generated, the jacks 30 fill and overcome the resistance of springs 192, 193, causing the latch-levers 191 to engage the neck of the nozzle 31 and secure it in the nozzle-coupling 25, and when the latch-levers are fully engaged the jacks 28 fill and overcome the resistance of springs 38$^c$, 189 to open the stop-valves 27, 27$^a$ and to open the switch 76 (or switches 76, 76$^a$), thus rendering the circuit 68, 71, 73, 75, 77 dead and opening the switch 56, thereby stopping the windlass motor 13 and allowing the windlass clutch 14 to disengage.

The accumulator spring 18$^d$ is so set that after the pressure in the hydraulic system has been built up so as to fill the jacks 28, 30 against the effort of springs 28$^c$, 189 and 192, 193 respectively, the accumulator 18 is charged to a pressure sufficient to ensure that the latches 191 retain the nozzle 31 against the load of the hose; and when so charged the accumulator throws the movable contact of switch 80 from the fixed contact 80$^a$ onto the fixed contact 80$^b$ thus breaking the relay circuit 68, 71, 74, 79, 90$^a$, 90 to stop the motor 16$^a$, and completing the circuit 72, 92, 90 of the hydraulic indicator lamp 48 through switch 91. The lamp 48 therefore remains illuminated as long as the accumulator is charged. The illumination of lamp 48 indicates that the system is in condition for transferring fuel from the tanker to the receiver. The receiver's operator therefore signals the tanker crew to commence pumping fuel.

Figure 16:
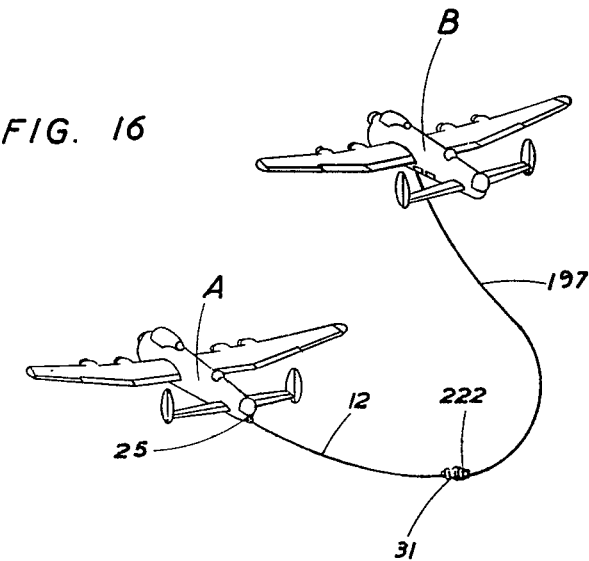
Figure 17:
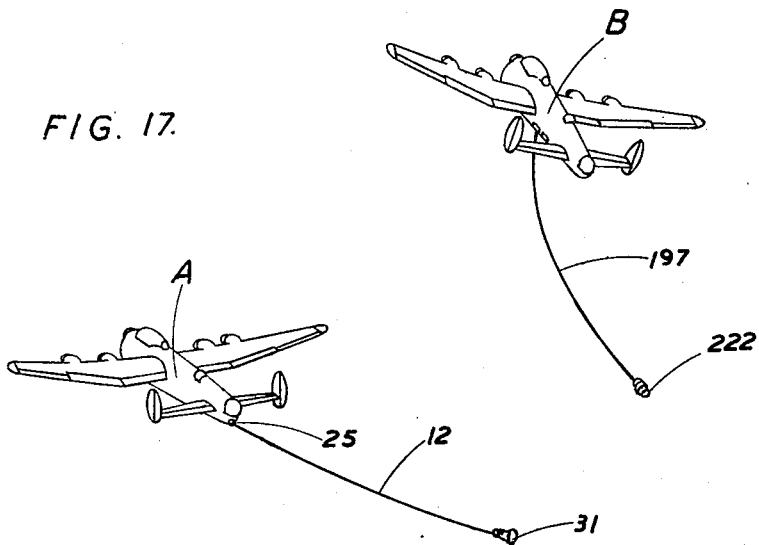

On completion of the refuelling operation, the receiver's operator places the master switch 46 in the trail position, thus breaking all the circuits connected to conductors 71, 72. Solenoid 19$^c$ is therefore deenergised allowing the control valve 19$^a$ to be opened by spring 19$^b$. This relieves the pressure in the hydraulic system and allows the accumulator 18 to discharge and the jacks 28, 30 to be emptied under the effort of springs 28$^c$, 189 and 192, 193 respectively, thereby causing the stop-valves 27, 27$^a$ to close and the latch-levers 191 to release the nozzle 31. At the same time the disconnection of conductor 72 causes the hydraulic indicator lamp 48 to be extinguished. The emptying of jack 28 causes the switch 76 (or switches 76, 76$^a$) to close, but, as the conductor 71 has already been rendered dead by movement of the master switch 46 off the contact 68, the windlass motor 13 is not restarted and the clutch 14 remains disengaged. The windlass is therefore enabled to pay out the hauling line freely under the tension applied by the hose 197 (Figure 16). The discharge of the accumlator 18 throws the switch 80 from the fixed contact 80$^b$ onto the fixed contact 80$^a$, but this is without any effect, seeing that both contacts 80$^a$ and 80$^b$ are already dead. When the hauling line is fully paid out the plug and socket coupling may be released to disconnect the nozzle 31 and hauling line 12 from the hose 197 (see Figure 17) by remote control means, which are not herein described as they form no part of the invention but are covered in my copending application Serial No. 138,958, filed January 17, 1950. Alternatively the hose 197 may be again reeled in by the tanker's crew and the plug and socket coupling may be released by hand to separate the hose from the nozzle and hauling line. When the hose has been disconnected from the hauling line, the master switch 46 is returned to the "wind" position to energise the windlass motor 13 and engage the windlass clutch 14 in the manner previously described and thereby wind in the hauling line, completing the same sequence as previously described, and when the hydraulic indicator lamp 48 is illuminated the master switch is thrown to the off position thus rendering all circuits dead, thereby extinguishing the main and hydraulic indicator lamps 47, 48 releasing the pressure in the hydraulic system, de-energising the distant-reading hauling line indicator system 24, 51, 50 and de-energising solenoid 44 to allow the windlass locking device 43 to arrest and lock the windlass.

If during the transfer of fuel from the tanker to the receiver aircraft an excessive tension is imposed on the hose, owing, for instance, to loss of station by the tanker aircraft, what is known as an "emergency break-away" takes place. As previously explained, excessive tension on the hose causes the jacks 30 to exert an excessive back pressure on the hydraulic system causing the relief valve 39 to open and enable the jacks 30 to empty and allow the latch-levers 191 to release the nozzle 31. When this occurs, the switch 91 opens and de-energises the solenoids 74 and 19$^c$ to stop the pump-motor 16$^a$ and open the control valve 19$^a$, thus relieving the pressure in the hydraulic system and allowing the stop-valves 27, 27ª to close and the accumulator 18 to be discharged. The discharge of the accumulator throws the switch 80 from the fixed contact 80ᵇ, onto the fixed contact 80ª, thus extinguishing the hydraulic indicator lamp 48. The emptying of the stop-valve-opening jack 28 closes the switch 76 (or switches 76, 76ª) and since the master switch is still in the wind position, completes the circuit through solenoid 73, thus closing the switch 56 to energise the windlass motor 13 and engage the windlass clutch 14. Owing, however, to the excessive tension applied by the hose to the hauling line, the latter continues to pay out against the effort applied by the motor 13. If, as is usually the case in the event of an emergency break-away, the paying out speed of the hauling line considerably exceeds the normal winding speed of the motor, the governor 20 throws the switch 78 from the fixed contact 78ª onto the fixed contact 78ᵇ, thus opening the circuit 71, 75, 77 and de-energising solenoid 73, and thereby opening switch 56 to stop the motor 13 and disengage the windlass clutch 14, at the same time completing circuit 72, 93 to illuminate the emergency break-away indicator lamp 49. The windlass 11 is thus freed, relieving the tension on the hauling line and allowing the latter to pay out freely. When a predetermined length of hauling line has been paid out, the nut 172 (see Figure 3ª) engages the lever 165 and, as the paying out continues, moves the latter progressively to close the outlet valve 159, 162 of the windlass airbrake 146—148 and thereby apply progressively increasing resistance to the rotation of the windlass to reduce the paying out speed of the hauling line. This avoids the danger of the hauling line becoming fully paid out while the windlass drum is still rotating at a high speed and, by sufficiently reducing the paying out speed of the windlass, enables the governor to throw over the switch 78 onto contact 78ª, thus extinguishing the emergency break-away indicator lamp 49 and re-starting the motor 13 and engaging clutch 14, thereby causing the windlass to start winding in the hauling line, re-engagement of the nozzle in the nozzle-coupling being effected in the manner already described. To provide for the event of an emergency break-away being sustained, an element of reduced strength is included in the connection between the nozzle 31 and the hose, which element will yield under excessive tension in the hose and hauling line and allow them to part from one another leaving the other parts of the connection intact, so as to enable the nozzle and hauling line to be re-connected to the hose on being again brought aboard the tanker, for the purpose of resuming the refuelling, by replacement of the reduced-strength element, which, with this object in view, is arranged to be easily extractable and replaceable. The last mentioned feature, however, forms no part of the present invention and is, therefore, not more fully described or illustrated.

I claim:

1. In an aircraft, apparatus for obtaining a supply of a liquid in flight adapted to co-operate with a hose mounted on and paid out by another aircraft, from which the liquid is to be transferred, and a nozzle-element operatively associated with the hose, said apparatus comprising a nozzle-receiving coupling element having a liquid transmitting passage therein and a central fairlead, a normally disengaged, nozzle-securing latch device mounted on the coupling element, a normally closed stop-valve controlling flow of liquid through said passage, a latch-engaging and stop-valve-opening power device, an electrical circuit for energising the latch-engaging and stop-valve-opening device, a hauling line rove through said fairlead and connectible to the hose, a windlass for winding in and paying out the hauling line, an electric motor for driving the windlass to wind in the hauling line, a windlass-motor-controlling electric circuit, spring-engageable means for locking the windless, electromagnetic means for releasing said windlass-locking means, an electric circuit for energising the electro-magnetic means, and a three-position master switch controlling the said electric circuits, said switch in the first position opening all the circuits, in the second position closing the windlass-lock releasing circuit only and in the third position energising all the circuits to release the windlass-lock, energise the windlass-motor to wind in the hauling line and enable the latch device to engage the nozzle-element and the stop-valve to be opened.

2. The combination claimed in claim 1 and including a switch mounted on the coupling element and closable responsively to the entrance of the nozzle-element into the coupling element to complete the closure of the latch-engaging and stop-valve-opening circuit when the master-switch is in the third named position and cause the latch device to engage the nozzle-element and the stop-valve to be opened.

3. The combination claimed in claim 1 and including a main indicator light and an electric circuit connected thereto, said circuit being connected in parallel with the windlass-lock-releasing circuit to the master switch and thereby becoming closed to illuminate the light, when the master switch is in the second and third named positions.

4. The combination claimed in claim 1 and including a distant-reading electrical counter device giving a visual indication of the length of hauling line payed out.

5. The combination claimed in claim 1 and including a distant-reading electrical counter device giving a visual indication of the length of hauling line paid out, an electric circuit connected to said counter device and connected in parallel with the windlass-lock-releasing circuit to the master switch and thereby becoming closed to energise the counter device when the master switch is in the second and third named positions.

6. The combination claimed in claim 1 and including a spring-disengaged clutch operative to connect the windlass-motor to the windlass and electromagnetic clutch-engaging means electrically connected in parallel with the windlass-motor to engage the clutch when the motor is started and keep it engaged as long as the motor is energised and disengage it when the motor is de-energised.

7. The combination claimed in claim 1, including a switch actuated by the latch-engaging and stop-valve opening means to open the windlass-motor-controlling circuit and de-energise the windlass-motor on engagement of the latch device and opening of the stop-valve.

8. The combination claimed in claim 1, in which the latch-engaging and stop-valve opening means include a source of hydraulic pressure, a latch-engaging hydraulic jack, a stop-valve-opening hydraulic jack and hydraulic connections between the said source and said jacks.

9. The combination claimed in claim 8, in which the hydraulic pressure source includes an electric motor, an hydraulic pump driven thereby, and an hydraulic pressure accumulator connected to said hydraulic connections, the pump-motor being controlled by the named latch-engaging and stop-valve-opening means-controlling circuit, an accumulator-operated switch and a lost-motion connection between the hydraulic accumulator to said last-named switch, said connection moving the switch to close the last-named circuit and energise the pump-motor when the accumulator is fully discharged and to open the last-named circuit and de-energise the pump-motor when the accumulator is fully charged.

10. The combination claimed in claim 8, in which the hydraulic pressure source includes an hydraulic pump, the combination further including an hydraulic reservoir connected to the hydraulic pump, a by-pass conecting the hydraulic jacks to the reservoir, and a spring-closed relief valve in said by-pass.

11. The combination claimed in claim 9, including an hydraulic reservoir connected to the pump, a return hydraulic connection between the hydraulic jacks and the reservoir, a spring-opened control valve in the return connection, electromagnetic means for closing the control valve, a switch on the coupling element closable responsively to the entrance of the nozzle into the coupling element, and an electric circuit for energising the last-named electromagnetic means, said circuit and the accumulator-operated switch being connected in parallel between the master switch and the nozzle element-actuated switch, whereby the last-named electromagnetic means remain energised to close the control valve and thereby retain the accumulator-stored pressure in the hydraulic jacks to hold the latch device in engagement with the nozzle-element and keep the stop-valve open as long as the master switch is in the third position and the nozzle-element-actuated switch is closed, irrespective of whether the pump-motor is energised or not.

12. The combination claimed in claim 9, including a second indicator light connected in parallel with the pump-motor-controlling circuit between the master switch and the accumulator-operated switch, the latter having two alternative positions in one of which it is connected to the indicator light and in the other to the pump-motor-controlling circuit, whereby the second indicator light is illuminated when the accumulator is charged and extinguished when the accumulator is discharged.

13. In an aircraft, apparatus for obtaining a supply of a liquid in flight adapted to co-operate with a hose mounted on and paid out by another aircraft from which the liquid is to be transferred, and a nozzle-element operatively associated with the hose, said apparatus comprising a nozzle-receiving coupling element having a liquid transmitting passage therein and a central fairlead, a hauling line rove through said fairlead and connectible to the hose, a windlass for winding in and paying out the hauling line, an electric motor for driving the windlass to wind in the hauling line, a windlass-driven governor and a windlass-motor-controlling switch actuated by the governor to de-energise the motor when the windlass exceeds a critical speed greater than its normal winding speed.

14. The combination claimed in claim 13 including a warning light and a governor-actuated switch electrically connected to the warning light for illuminating the latter when the said critical speed is exceeded.

15. In an aircraft, apparatus for obtaining a supply of a liquid in flight adapted to co-operate with a hose mounted on and paid out by another aircraft, from which the liquid is to be transferred, and a nozzle-element operatively associated with the hose, said apparatus comprising a nozzle-receiving coupling element having a liquid transmitting passage therein and a central fairlead, a hauling line rove through said fairlead and connectible to the hose, a windlass for winding in and paying out the hauling line, a windlass brake, and a windlass-driven device operative to initiate application of the windlass brake when a predetermined length of hauling line has been paid out and thereafter to apply the brake progressively as paying out continues.

16. The combination claimed in claim 15, in which the windlass-brake comprises a displacement air-compressor having an open entry, a relief valve set to blow-off at a predetermined pressure and a spring-opened outlet valve progressively closable by the windlass-driven device.

17. In an aircraft, apparatus for obtaining a supply of a liquid in flight adapted to co-operate with a hose mounted on and paid out by another aircraft, from which the liquid is to be transferred, and a nozzle-element operatively associated with the hose, said apparatus comprising a nozzle-receiving coupling element having a liquid transmitting passage therein and a central fairlead, a hauling line rove through said fairlead and connectible to the hose, a windlass for winding in and paying out the hauling line, a windlass brake, a windlass-driven lead-screw, a nut in threaded engagement with the lead-screw, means preventing the nut from rotating, and a lever engageable by the nut when the latter has advanced a predetermined distance along the lead-screw and movable by the nut to apply the windlass-brake progressively as the nut advances further.

18. The combination claimed in claim 17, in which the nut-engaging face of the lever is inclined at an acute angle to the axis of the lead-screw, said angle increasing as the nut advances in engagement with the lever, whereby the rate of application of the brake relatively to the rate of advance of the nut increases as the nut advances in engagement with the lever.

RONALD FREDERICK WORLIDGE.

References Cited in the file of this patent

UNITED STATES PATENTS

| Number | Name | Date |
|---|---|---|
| 1,306,090 | Weiss | June 10, 1919 |
| 1,848,372 | Moran | Mar. 8, 1932 |
| 1,867,596 | Roseman | July 19, 1932 |
| 2,097,053 | Zalesak | Oct. 26, 1937 |
| 2,123,648 | Cobham | July 12, 1938 |
| 2,199,588 | Cobham | May 7, 1940 |
| 2,237,112 | Parvin | Apr. 1, 1941 |
| 2,443,763 | Dahlgren | June 22, 1948 |
| 2,582,609 | Steele | Jan. 15, 1952 |